US008605077B2

(12) United States Patent
Senda

(10) Patent No.: US 8,605,077 B2
(45) Date of Patent: Dec. 10, 2013

(54) DISPLAY DEVICE

(75) Inventor: Takahiro Senda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 140 days.

(21) Appl. No.: 13/382,508

(22) PCT Filed: Apr. 28, 2010

(86) PCT No.: PCT/JP2010/057556
§ 371 (c)(1),
(2), (4) Date: Jan. 5, 2012

(87) PCT Pub. No.: WO2011/004646
PCT Pub. Date: Jan. 13, 2011

(65) Prior Publication Data

US 2012/0105427 A1 May 3, 2012

(30) Foreign Application Priority Data

Jul. 10, 2009 (JP) ................................ 2009-163246

(51) Int. Cl.
*G06F 3/038* (2013.01)

(52) U.S. Cl.
USPC ............... 345/212; 345/205; 345/76; 345/82; 315/169.3

(58) Field of Classification Search
USPC .............. 345/212, 92, 205, 76, 82; 315/169.3
See application file for complete search history.

(56) References Cited

U.S. PATENT DOCUMENTS

| | | | | |
|---|---|---|---|---|
| 7,649,515 | B2 * | 1/2010 | Ozawa et al. | 345/82 |
| 2005/0237273 | A1 | 10/2005 | Ozawa et al. | |
| 2005/0243036 | A1 * | 11/2005 | Ikeda | 345/76 |

(Continued)

FOREIGN PATENT DOCUMENTS

| | | |
|---|---|---|
| JP | 2005-128521 A | 5/2005 |
| JP | 2005-309150 A | 11/2005 |

(Continued)

OTHER PUBLICATIONS

Extended European Search Report received for European Patent Application No. 10796957.8, mailed on May 15, 2012, 9 pages.

(Continued)

*Primary Examiner* — Lun-Yi Lao
*Assistant Examiner* — Kelly B Hegarty
(74) *Attorney, Agent, or Firm* — Morrison & Foerster LLP

(57) ABSTRACT

TFTs 10 and 15 and the organic EL device 17 are provided between a power line Vp and a common cathode Vcom, and a capacitor 16 and a TFT 11 are provided between a gate of the TFT 10 and a data line Sj. A TFT 12 is provided between the gate and a drain of the TFT 10, a TFT 13 is provided between an anode terminal of the organic EL device 17 and the common cathode Vcom, and a TFT 14 is provided between one electrode of the capacitor 16 and the power line Vp. Gates of the TFTs 11 to 13 are connected to a scanning line Gi, and gates of the TFTs 14 and 15 are connected to a scanning line Ei. When writing, a high potential is supplied to the scanning line Gi, and a low potential is supplied to the scanning line Ei a little after this. While the high potentials are supplied to the two scanning lines, the data line Sj is controlled to be in a high impedance state. In this manner, a pixel circuit configured by N-type transistors is driven using two types of scanning lines.

7 Claims, 10 Drawing Sheets

(56) References Cited

U.S. PATENT DOCUMENTS

| | | | | |
|---|---|---|---|---|
| 2005/0259051 | A1* | 11/2005 | Lee et al. | 345/76 |
| 2006/0103324 | A1* | 5/2006 | Kim et al. | 315/169.3 |
| 2007/0085782 | A1* | 4/2007 | Matsumoto et al. | 345/76 |
| 2007/0103406 | A1 | 5/2007 | Kim | |
| 2009/0303260 | A1 | 12/2009 | Takasugi | |
| 2010/0225623 | A1 | 9/2010 | Ohhashi et al. | |
| 2011/0080395 | A1* | 4/2011 | Chung | 345/211 |
| 2013/0050161 | A1* | 2/2013 | Park et al. | 345/204 |

FOREIGN PATENT DOCUMENTS

| | | | |
|---|---|---|---|
| JP | 2006-146219 | A | 6/2006 |
| JP | 2006-276250 | A | 10/2006 |
| JP | 2007-133369 | A | 5/2007 |
| JP | 2008-310075 | A | 12/2008 |
| WO | 2007/063662 | A1 | 6/2007 |
| WO | 2007/144976 | A1 | 12/2007 |

OTHER PUBLICATIONS

International Search Report received for PCT Patent Application No. PCT/JP2010/057556, mailed on Jun. 1, 2010, 5 pages (2 pages of English translation and 3 pages of PCT Search Report).

* cited by examiner

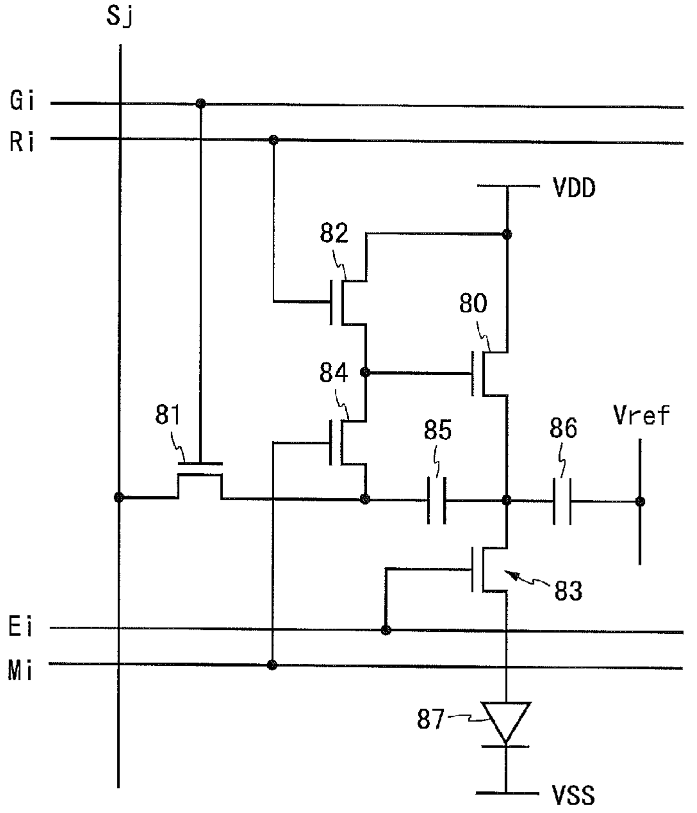
*Fig. 9*
Prior Art
*Fig. 10*
Prior Art
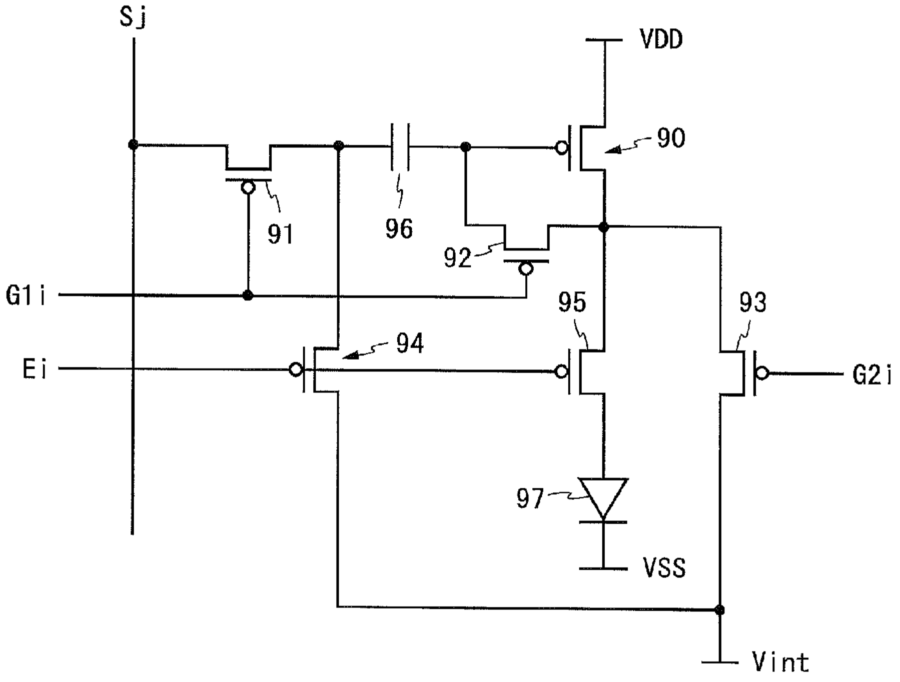

DISPLAY DEVICE

CROSS REFERENCE TO RELATED APPLICATIONS

This is a U.S. National Phase patent application of PCT/JP2010/057556, filed Apr. 28, 2010, which claims priority to Japanese Patent Application No. 2009-163246, filed Jul. 10, 2009, each of which is hereby incorporated by reference in the present disclosure in its entirety.

TECHNICAL FIELD

The present invention relates to display devices, and in particular to a current-driven display device such as an organic EL display.

BACKGROUND ART

In recent years, organic EL (Electro Luminescence) displays have been gaining attention as thin, lightweight, and fast-responsive display devices. While small-size organic EL displays have mainly been developed, development of medium-size and large-size organic EL displays is also conducted in recent years.

A TFT (Thin Film Transistor) substrate for small-size organic EL displays is manufactured using low-temperature polysilicon. In a manufacturing process using low-temperature polysilicon, both a P-channel type TFT and an N-channel type TFT can be formed on a TFT substrate. Accordingly, it is possible to suitably design a pixel circuit including an organic EL device using two types of TFTs, and to reduce wiring and power lines on the TFT substrate. In addition, a drive circuit for an organic EL device can be formed on the TFT substrate.

By contrast, a TFT substrate for medium-size and large-size organic EL displays is manufactured using amorphous silicon, microcrystalline silicon, or IGZO (Indium Gallium Zinc Oxide), in order to reduce cost. However, formation of a P-channel type TFT on a TFT substrate in a manufacturing process using such a material has not been successful at practical level so far. Therefore, in a medium-size or large-size organic EL display, it is necessary to configure a pixel circuit using only N-channel type TFTs.

Further, as it is not possible to form a P-channel type TFT on the TFT substrate, it becomes difficult to form a drive circuit for an organic EL device on the TFT substrate. As a result, ends of scanning lines are often pulled outside the TFT substrate as they are. In this case, as the number of scanning lines increases, the manufacturing cost is increased and reliability is reduced. Therefore, in medium-size and large-size organic EL displays, it is necessary to reduce the number of scanning lines as much as possible.

There have conventionally been known various pixel circuits for organic EL displays. For example, as shown in FIG. 9, Patent Document 1 describes a pixel circuit including N-channel type TFTs 80 to 84, capacitors 85 and 86, and an organic EL device 87. As shown in FIG. 10, Patent Document 2 describes a pixel circuit including P-channel type TFTs 90 to 95, a capacitor 96, and an organic EL device 97.

PRIOR ART DOCUMENTS

Patent Documents

[Patent Document 1] Japanese Laid-Open Patent Publication No. 2008-310075

[Patent Document 2] Japanese Laid-Open Patent Publication No. 2007-133369

SUMMARY OF THE INVENTION

Problems to be Solved by the Invention

The pixel circuit shown in FIG. 9 is configured using N-channel type TFTs, and can be utilized in medium-size and large-size organic EL displays. However, this pixel circuit includes the two capacitors 85 and 86, and is driven using four types of scanning lines Gi, Ri, Ei, and Mi. Therefore, the pixel circuit shown in FIG. 9 poses a problem that a volume of the circuit and the number of scanning lines are large.

The pixel circuit shown in FIG. 10 includes the single capacitor 96, and is driven using three types of scanning lines G1*i*, G2*i*, and Ei. This pixel circuit has an advantage that a volume of the circuit and the number of the scanning lines are small. However, this pixel circuit is configured using P-channel type TFTs. Therefore, the pixel circuit shown in FIG. 10 poses a problem that this pixel circuit cannot be utilized in medium-size and large-size organic EL displays.

Thus, an object of the present invention is to provide a display device having a pixel circuit that is configured by N-channel type transistors and can be driven using two types of scanning lines.

Means for Solving the Problems

According to a first aspect of the present invention, there is provided a current-driven display device including: a plurality of pixel circuits arranged two-dimensionally and each configured by an N-channel type transistor; a plurality of first scanning lines and a plurality of second scanning lines, each of the first and second scanning lines being provided for a row of the pixel circuits; a plurality of data lines each provided for a column of the pixel circuits; a scanning line drive circuit configured to select the pixel circuits by row using the first and second scanning lines; and a data line drive circuit configured to supply a data potential according to display data to the data line, wherein each of the pixel circuits includes: an electro-optical device provided between a first conductive member to which a first power source potential is applied and a second conductive member to which a second power source potential is applied; a driving transistor provided between the first and second conductive members in series with the electro-optical device; a capacitor having a first electrode connected to a gate terminal of the driving transistor; a first switching transistor provided between a second electrode of the capacitor and the data line; a second switching transistor provided between the gate terminal and a drain terminal of the driving transistor; a third switching transistor having one conducting terminal connected to a node to which one terminal of the electro-optical device is connected; a fourth switching transistor provided between the second electrode of the capacitor and the first conductive member; and a fifth switching transistor provided between the first and second conductive members in series with the electro-optical device and the driving transistor, and having a source terminal connected to the drain terminal of the driving transistor, and gate terminals of the first, second, and third switching transistors are connected to the first scanning line, and gate terminals of the fourth and fifth switching transistors are connected to the second scanning line.

According to a second aspect of the present invention, in the first aspect of the present invention, the electro-optical device is provided between a source terminal of the driving transistor and the second conductive member, and a drain terminal of the fifth switching transistor is connected to the first conductive member.

According to a third aspect of the present invention, in the second aspect of the present invention, a source terminal of the third switching transistor is connected to the second conductive member.

According to a fourth aspect of the present invention, in the first aspect of the present invention, the electro-optical device is provided between a drain terminal of the fifth switching transistor and the first conductive member, and a source terminal of the driving transistor is connected to the second conductive member.

According to a fifth aspect of the present invention, in the fourth aspect of the present invention, a drain terminal of the third switching transistor is connected to the first conductive member.

According to a sixth aspect of the present invention, in the first aspect of the present invention, when selecting the pixel circuits, the scanning line drive circuit supplies a high-level potential to the first scanning line for a predetermined period of time, a low-level potential to the second scanning line after supplying the high-level potential to the first scanning line, and a high-level potential to the second scanning line after supplying a low-level potential to the first scanning line, and the data line drive circuit controls the data line to be in a high impedance state while the high-level potentials are being supplied to the first and second scanning lines, and supplies the data potential to the data line while the high-level potential is being supplied to the first scanning line and the low-level potential is being supplied to the second scanning line.

According to a seventh aspect of the present invention, in the first aspect of the present invention, the electro-optical device is configured by an organic EL device.

Effects of the Invention

According to the first aspect of the present invention, a potential that changes according to the data potential and a threshold voltage of the driving transistor is supplied to the gate terminal of the driving transistor using the first, second, fourth, and fifth switching transistors, and whereby it is possible to cause the electro-optical device to emit light at desired luminance while compensating the threshold voltage of the driving transistor. Further, using the third switching transistor, it is possible to turn the electro-optical device off while the data potential is written. The driving transistor and the first to fifth switching transistors are each configured by an N-channel type transistor, the gate terminals of the first to third switching transistors are connected to the first scanning line, and the gate terminals of the fourth and fifth switching transistors are connected to the second scanning line. Accordingly, it is possible to achieve a display device provided with the pixel circuit that is configured by N-channel type transistors, can be driven using two types of the scanning lines, and is capable of compensating the threshold voltage of the driving transistor.

According to the second aspect of the present invention, when the fifth switching transistor, the driving transistor, and the electro-optical device are arranged between the first and second conductive members in the stated order sequentially from a side of the first conductive member, it is possible to achieve a display device provided with the pixel circuit that is configured by N-channel type transistors, can be driven using two types of the scanning lines, and is capable of compensating the threshold voltage of the driving transistor.

According to the third aspect of the present invention, by connecting the source terminal of the third switching transistor to the second conductive member, it is possible to apply the predetermined potential to the one terminal of the electro-optical device from the second conductive member without providing a new power line.

According to the fourth aspect of the present invention, when the electro-optical device, the fifth switching transistor, and the driving transistor are arranged between the first and second conductive members in the stated order sequentially from a side of the first conductive member, it is possible to achieve a display device provided with the pixel circuit that is configured by N-channel type transistors, can be driven using two types of the scanning lines, and is capable of compensating the threshold voltage of the driving transistor.

According to the fifth aspect of the present invention, by connecting the drain terminal of the third switching transistor to the first conductive member, it is possible to apply the predetermined potential to the one terminal of the electro-optical device from the first conductive member without providing a new power line.

According to the sixth aspect of the present invention, by applying the high-level potential to the first scanning line for the predetermined period of time and the low-level potential to the second scanning line a little after that, it is possible to hold the potential difference that changes according to the data potential and the threshold voltage of the driving transistor between the electrodes of the capacitor, and to supply the potential that changes according to the data potential and the threshold voltage of the driving transistor to the gate terminal of the driving transistor. With this, it is possible to cause the electro-optical device to emit light at desired luminance while compensating the threshold voltage of the driving transistor. Further, by controlling the data line to be in the high impedance state while the high-level potentials are being supplied to the first and second scanning lines, it is possible to prevent an unnecessary current from flowing from the first conductive member (a power line or a power electrode) to the data line.

According to the seventh aspect of the present invention, it is possible to achieve an organic EL display provided with the pixel circuit that is configured by N-channel type transistors, can be driven using two types of the scanning lines, and is capable of compensating the threshold voltage of the driving transistor.

BRIEF DESCRIPTION OF DRAWINGS

FIG. 9 is a circuit diagram of a pixel circuit included in a display device according to a conventional art (first example).

FIG. 10 is a circuit diagram of a pixel circuit included in a display device according to a conventional art (second example).

MODE FOR CARRYING OUT THE INVENTION

A display device according to first and second embodiments of the present invention is now described with reference to the drawings. The display device according to the embodiments is provided with a pixel circuit including an electro-optical device, a capacitor, a driving transistor, and a plurality of switching transistors. The pixel circuit includes an organic EL device as the electro-optical device, and TFTs as the driving transistor and the switching transistors. The TFTs included in the pixel circuit are made of amorphous silicon, microcrystalline silicon, IGZO, or low-temperature polysilicon, for example. In the following description, n and m are integers not smaller than 2, i is an integer not smaller than 1 and not greater than n, and j is an integer not smaller than 1 and not greater than m.

Figure 1:
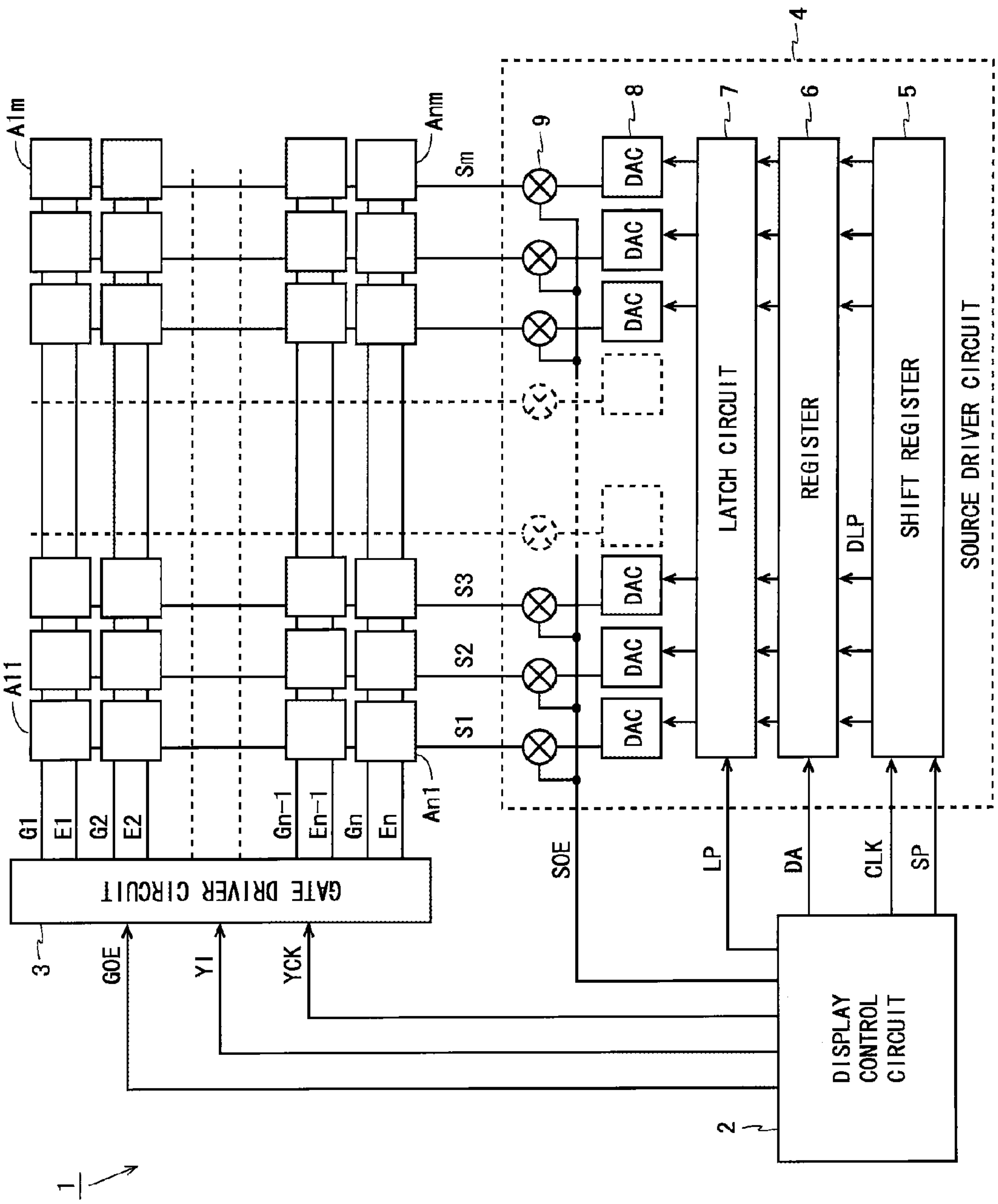
FIG. 1 is a block diagram illustrating a configuration of a display device according to first and second embodiments of the present invention.

FIG. 1 is a block diagram illustrating a configuration of the display device according to the first and second embodiments of the present invention. A display device 1 shown in FIG. 1 is provided with a plurality of pixel circuits Aij, a display control circuit 2, a gate driver circuit 3, and a source driver circuit 4. The pixel circuits Aij are each configured by an N-channel type transistor, and two-dimensionally arranged such that m circuits are arranged in each row and n circuits are arranged in each column. Each row of the pixel circuits Aij is provided with two types of scanning lines Gi and Ei, and each column of the pixel circuits Aij is provided with a data line Sj. The pixel circuits Aij are disposed respectively at intersections between the scanning lines Gi and the data lines Sj.

The scanning lines Gi and Ei are connected to the gate driver circuit 3, and the data line Sj is connected to the source driver circuit 4. Potentials of the scanning lines Gi and Ei are controlled by the gate driver circuit 3, and a potential of the data line Sj is controlled by the source driver circuit 4. Further, although not shown in FIG. 1, in order to supply a source voltage to the pixel circuits Aij, a power line Vp and a common cathode Vcom (alternatively, a common anode Vp and a power line Vcom) are provided in an area in which the pixel circuits Aij are arranged.

The display control circuit 2 outputs a gate output enable signal GOE, a start pulse YI, and a clock YCK to the gate driver circuit 3, and a start pulse SP, a clock CLK, a display data DA, a latch pulse LP, and a source output enable signal SOE to the source driver circuit 4.

The gate driver circuit 3 includes a shift register circuit, a logical operation circuit, and a buffer (all of which are not depicted in the drawing). The shift register circuit sequentially transfers the start pulse YI in synchronization with the clock YCK. The logical operation circuit performs a logical operation between a pulse outputted from each stage in the shift register circuit and the gate output enable signal GOE. The output from the logical operation circuit is fed to corresponding ones of the scanning lines Gi and Ei through the buffer. In this manner, the gate driver circuit 3 functions as a scanning line drive circuit configured to select the pixel circuits Aij by row using the scanning lines Gi and Ei.

The source driver circuit 4 includes an m-bit shift register 5, a register 6, a latch circuit 7, m D/A converters 8, and m analog switches 9. The shift register 5 includes m one-bit registers that are cascade connected. The shift register 5 sequentially transfers the start pulse SP in synchronization with the clock CLK, and outputs a timing pulse DLP from each register. At a timing according to the output of the timing pulse DLP, the display data DA is supplied to the register 6. The register 6 stores the display data DA according to the timing pulse DLP. Upon recording the display data DA for a single row in the register 6, the display control circuit 2 outputs the latch pulse LP to the latch circuit 7. Upon storing the latch pulse LP, the latch circuit 7 holds the display data stored in the register 6.

The D/A converters 8 and the analog switches 9 are provided corresponding to the data lines Sj. Each D/A converter 8 converts the display data held by the latch circuit 7 into an analog signal voltage. The analog switches 9 are respectively provided between the outputs from the D/A converters 8 and the data lines Sj. Each analog switch 9 is switched between an ON state and an OFF state according to the source output enable signal SOE outputted from the display control circuit 2. When the source output enable signal SOE is high-level, the analog switch 9 is in the ON state, and each data line Sj is supplied with the analog signal voltage outputted from the corresponding D/A converter 8. When the source output enable signal SOE is low-level, the analog switch 9 is in the OFF state, and each data line Sj is turned to a high impedance state. In this manner, the source driver circuit 4 functions as a data line drive circuit configured to supply potentials according to the display data to the data lines Sj.

First Embodiment

Figure 2:
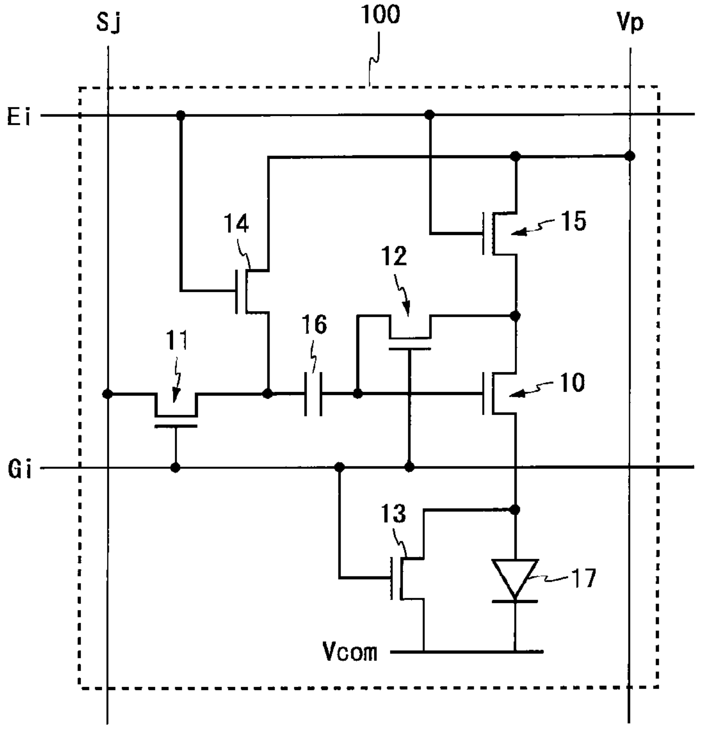
FIG. 2 is a circuit diagram of a pixel circuit included in the display device according to the first embodiment of the present invention.

FIG. 2 is a circuit diagram of a pixel circuit included in the display device according to the first embodiment of the present invention. A pixel circuit 100 shown in FIG. 2 is provided with a driving TFT 10, switching TFTs 11 to 15, a capacitor 16, and an organic EL device 17. The pixel circuit 100 corresponds to each of the pixel circuits Aij in FIG. 1. All of the driving TFT 10 and the switching TFTs 11 to 15 are N-channel type transistors.

The pixel circuit 100 is connected to the power line Vp, the common cathode Vcom, the scanning lines Gi and Ei, and the data line Sj. To the power line Vp and the common cathode Vcom, respectively, constant power source potentials VDD and VSS are applied. The common cathode Vcom is a common electrode common to all of the organic EL devices 17 within the display device. The power line Vp functions as a first conductive member, and the common cathode Vcom functions as a second conductive member. The scanning line Gi functions as a first scanning line, and the scanning line Ei functions as a second scanning line.

In the pixel circuit 100, the switching TFT 15, the driving TFT 10, and the organic EL device 17 are provided in series on a route connecting the power line Vp and the common cathode Vcom, in the stated order from a side of the power line Vp. More specifically, a drain terminal of the switching TFT 15 is connected to the power line Vp, and a source terminal of the switching TFT 15 is connected to a drain terminal of the driving TFT 10. A source terminal of the driving TFT 10 is connected to an anode terminal of the organic EL device 17, and a cathode terminal of the organic EL device 17 is connected to the common cathode Vcom. In this manner, in the pixel circuit 100, the organic EL device 17 is provided between the source terminal of the driving TFT 10 and the common cathode Vcom, and the drain terminal of the switching TFT 15 is connected to the power line Vp.

One electrode of the capacitor 16 (an electrode on the right side in FIG. 2, and hereinafter referred to as a first electrode) is connected to a gate terminal of the driving TFT 10. The switching TFT 11 is provided between the other electrode of the capacitor 16 (an electrode on the left side in FIG. 2, and hereinafter referred to as a second electrode) and the data line Sj. The switching TFT 12 is provided between the gate terminal and the drain terminal of the driving TFT 10. The switching TFT 13 is provided between the anode terminal of the organic EL device 17 and the common cathode Vcom. A drain terminal of the switching TFT 13 is connected to the node to which the anode terminal of the organic EL device 17 is connected, and a source terminal of the switching TFT 13 is connected to the common cathode Vcom. In this manner, the switching TFT 13 is provided between the power line Vp and the common cathode Vcom in parallel to the organic EL device 17. The switching TFT 14 is provided between the second electrode of the capacitor 16 and the power line Vp. The gate terminals of the switching TFTs 11 to 13 are connected to the scanning line Gi, and the gate terminals of the switching TFTs 14 and 15 are connected to the scanning line Ei.

Figure 3:
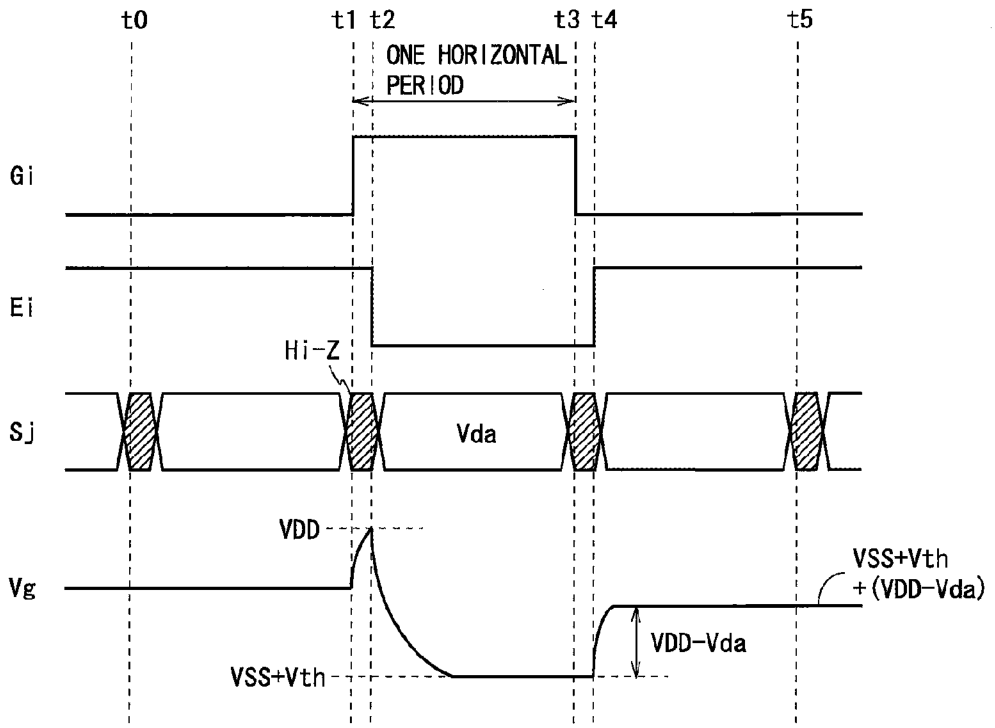
FIG. 3 is a timing chart for the pixel circuit shown in FIG. 2.

FIG. 3 is a timing chart for the pixel circuit 100. FIG. 3 shows changes in the potentials applied to the scanning lines Gi and Ei and the data line Sj, and a change in a gate potential Vg of the driving TFT 10. In FIG. 3, a time period during which the potential of the scanning line Gi is high-level (a time period from a time t1 to a time t3) corresponds to a single horizontal period. In the following, an operation of the pixel circuit 100 is described with reference to FIG. 3 and FIG. 4A to FIG. 4E.

Before the time t1, the potential of the scanning line Gi is controlled to be low-level, and the potential of the scanning line Ei is controlled to be high-level. At this time, the switching TFTs 11 to 13 are in the OFF state, and the switching TFTs 14 and 15 are in the ON state. Further, the driving TFT 10 is also in the ON state. Therefore, a current flows between the power line Vp and the common cathode Vcom, passing through the switching TFT 15, the driving TFT 10, and the organic EL device 17, and this causes the organic EL device 17 to emit light (see FIG. 4A).

At the time t1, when the potential of the scanning line Gi changes to high-level, the switching TFTs 11 to 13 are turned to the ON state. Further, from the time t1 to a time t2, the data line Sj is controlled to be in the high impedance state. When the switching TFT 12 is turned to the ON state, a current from the power line Vp flows through the switching TFT 15 and the switching TFT 12, and the gate potential Vg of the driving TFT 10 rises up to the potential VDD of the power line Vp. Further, a resistance of the switching TFT 13 is sufficiently smaller than a resistance of the organic EL device 17. Therefore, when the switching TFT 13 is turned to the ON state, the current that has been flowing through the organic EL device 17 flows through the switching TFT 13 to the common cathode Vcom, and this turns the organic EL device 17 off (see FIG. 4B). It should be noted that the data line Sj is controlled to be the high impedance state at this time, and therefore even if the switching TFT 11 is turned to the ON state, an unnecessary current does not flow between the power line Vp and the data line Sj through the switching TFT 14 and the switching TFT 11.

At the time t2, when the potential of the scanning line Ei changes to low-level, the switching TFTs 14 and 15 are turned to the OFF state. Further, during a period from the time t2 to the time t3, a potential according to the display data (hereinafter referred to as a data potential Vda) is applied to the data line Sj. When the switching TFT 15 is turned to the OFF state, the current that has been flowing from the power line Vp stops flowing, and a current Ia flows between the gate terminal of the driving TFT 10 and the common cathode Vcom, passing through the switching TFT 12, the driving TFT 10, and the switching TFT 13 (see FIG. 4C).

When the current Ia flows, the gate potential Vg of the driving TFT 10 drops. When a potential difference between the gate and the source of the driving TFT 10 becomes equal to a threshold voltage Vth of the driving TFT 10, the driving TFT 10 is turned to the OFF state, and the current Ia stops flowing. Therefore, the gate potential Vg of the driving TFT 10 reaches (VSS+Vth) after a while from the time t2, and stops dropping after this point.

Further, when the data potential Vda is applied to the data line Sj, a current flows from the data line Sj to the second electrode of the capacitor 16 through the switching TFT 11. Therefore, the potential of the second electrode of the capacitor 16 becomes equal to the data potential Vda. As a result, after a while from the time t2, the potential of the first electrode of the capacitor 16 becomes equal to (VSS+Vth), and the potential of the second electrode becomes Vda.

At the time t3, when the potential of the scanning line Gi changes to low-level, the switching TFTs 11 to 13 are turned to the OFF state. At this time, the capacitor 16 holds the potential difference (VSS+Vth-Vda) between the electrodes (see FIG. 4D).

At a time t4, when the potential of the scanning line Ei changes to high-level, the switching TFTs 14 and 15 are turned to the ON state. When the switching TFT 14 is turned to the ON state, a current flows from the power line Vp to the second electrode of the capacitor 16 through the switching TFT 14, and the potential of the second electrode of the capacitor 16 rises up to the potential VDD of the power line Vp. The potential difference between the electrodes of the capacitor 16 does not change before and after the time t4, and therefore when the potential of the second electrode of the capacitor 16 changes from Vda to VDD, the potential of the first electrode of the capacitor 16 changes by the same amount (VDD−Vda). Therefore, the gate potential Vg of the driving TFT 10 changes from (VSS+Vth) to {VSS+Vth+(VDD−Vda)}.

Figure 4A:
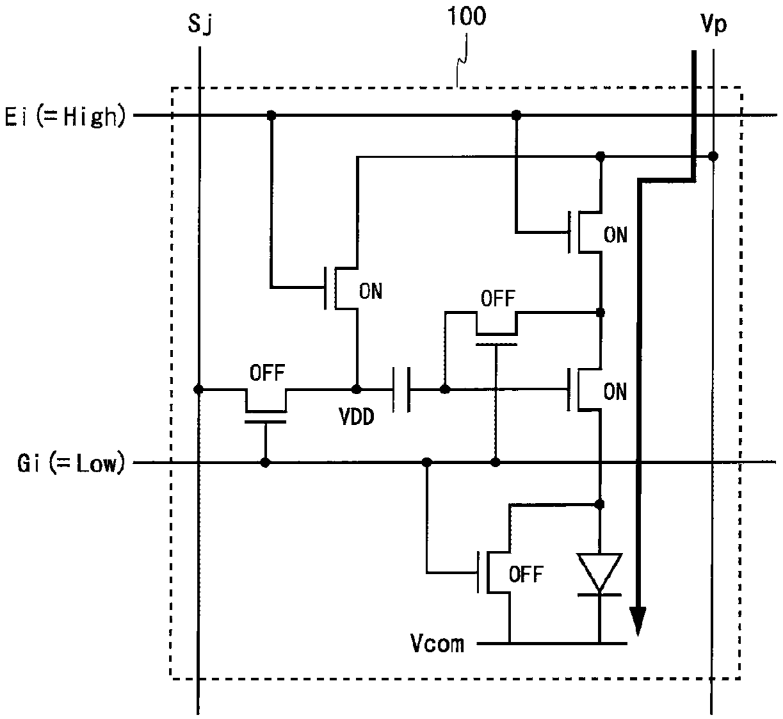
FIG. 4A is a diagram illustrating a state of the pixel circuit shown in FIG. 2 before writing.
Figure 4B:
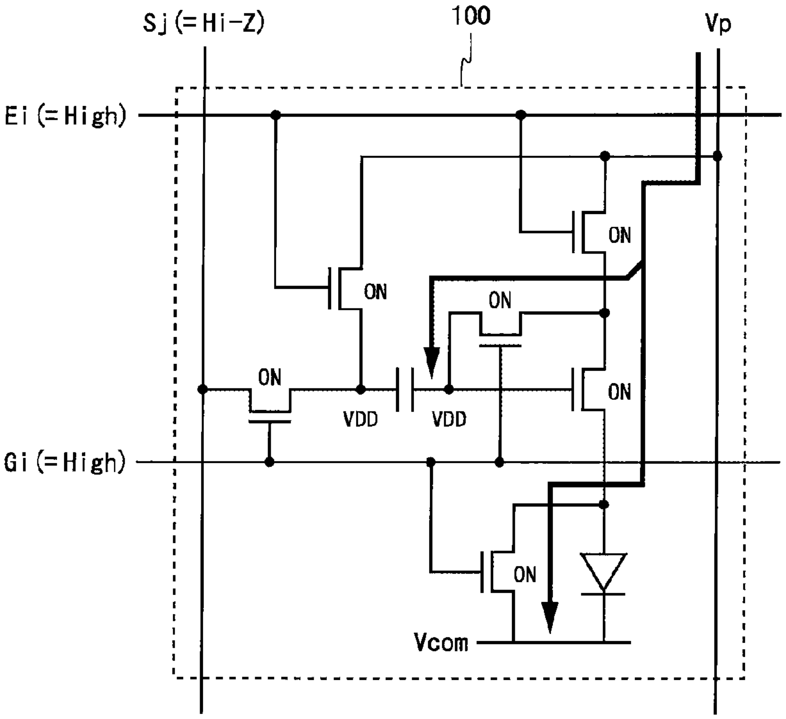
FIG. 4B is a diagram illustrating a state of the pixel circuit shown in FIG. 2 in initialization.
Figure 4C:
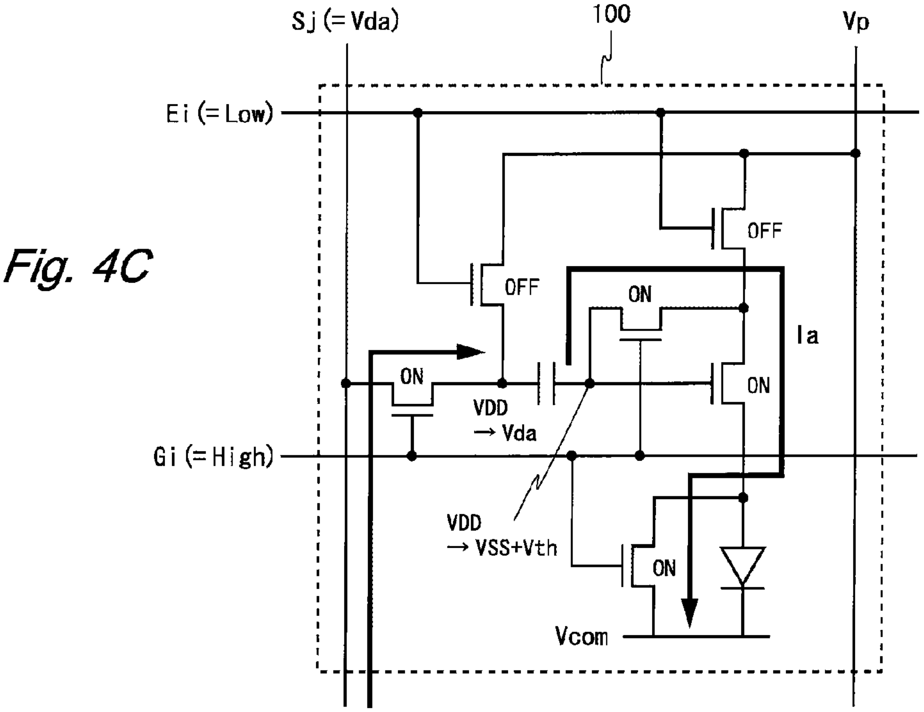
FIG. 4C is a diagram illustrating a state of the pixel circuit shown in FIG. 2 during writing.
Figure 4D:
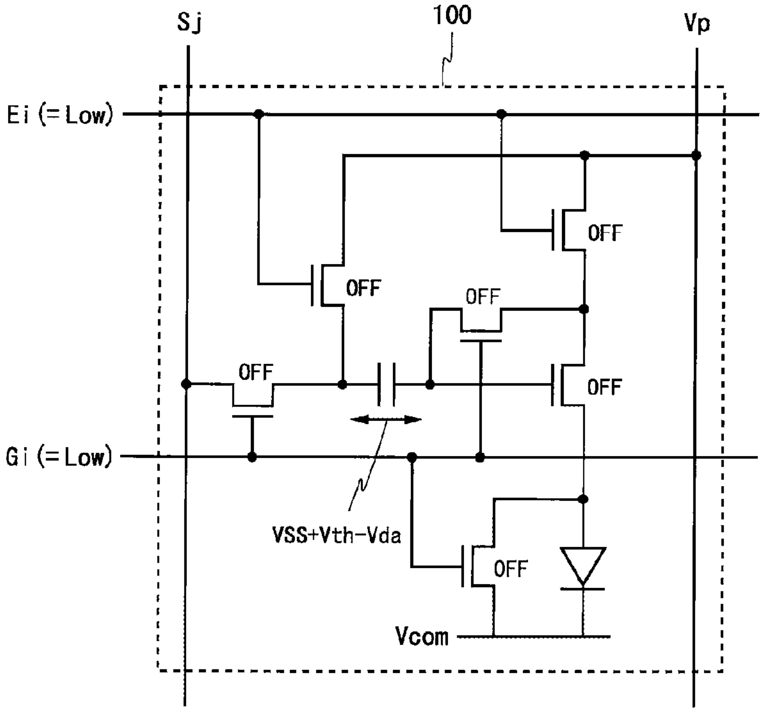
FIG. 4D is a diagram illustrating a state of the pixel circuit shown in FIG. 2 before lighting.
Figure 4E:
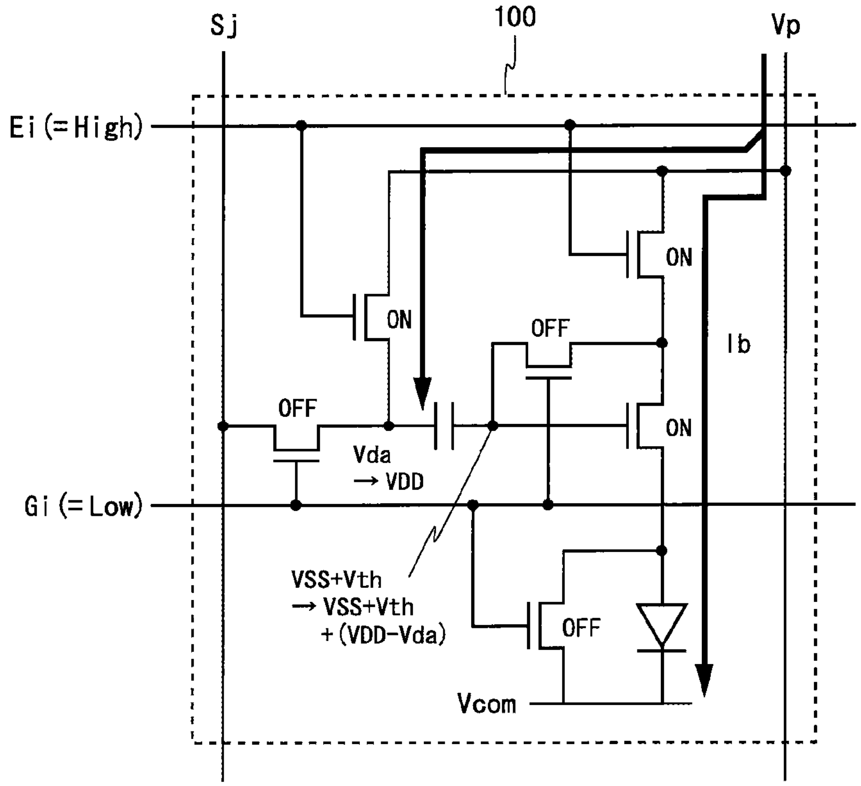
FIG. 4E is a diagram illustrating a state of the pixel circuit shown in FIG. 2 after lighting.

Further, as the switching TFT 15 is turned to the ON state, a current Ib flows between the power line Vp and the common cathode Vcom, passing through the switching TFT 15, the driving TFT 10, and the organic EL device 17, and this causes the organic EL device 17 to emit light (see FIG. 4E). When the gate potential of the driving TFT 10 is Vg, and the threshold voltage of the driving TFT 10 is Vth, an amount of the current Ib is proportional to (Vg−Vth)2. Further, after the time t4, the gate potential Vg of the driving TFT 10 is {VSS+Vth+(VDD−Vda)}.

Accordingly, the amount of the current Ib changes according to the data potential Vda, and is not dependent upon the threshold voltage Vth of the driving TFT 10. Therefore, even if the threshold voltage Vth of the driving TFT 10 includes variation, the amount of the current Ib that flows through the organic EL device 17 after the time t4 remains the same, and the organic EL device 17 emits light at luminance according to the display data. Thus, by driving the pixel circuit 100 according to the timings shown in FIG. 3, it is possible to compensate the threshold voltage of the driving TFT 10 and to cause the organic EL device 17 to emit light at desired luminance.

As described above, according to the display device of this embodiment, the potential {VSS+Vth+(VDD−Vda)} that changes according to the data potential Vda and the threshold voltage Vth of the driving transistor is supplied to the gate terminal of the driving TFT 10 using the switching TFTs 11, 12, 14, and 15, and whereby it is possible to cause the organic EL device 17 to emit light at desired luminance while compensating the threshold voltage of the driving TFT 10. Further, using the switching TFT 13, it is possible to turn the organic EL device 17 off while the data potential is written. The driving TFT 10 and the switching TFTs 11 to 15 are each configured by an N-channel type transistor, the gate terminals of the switching TFTs 11 to 13 are connected to the scanning line Gi, and the gate terminals of the switching TFTs 14 and 15 are connected to the scanning line Ei. Accordingly, it is possible to achieve an organic EL display provided with the pixel circuit 100 that is configured by N-channel type transistors, can be driven using two types of the scanning lines Gi and Ei, and is capable of compensating the threshold voltage of the driving TFT 10.

Moreover, by applying a high-level potential to the scanning line Gi for a predetermined period of time and a low-level potential to the scanning line Ei a little after that, it is possible to hold the potential difference (VSS+Vth−Vda) that changes according to the data potential Vda and the threshold voltage Vth of the driving TFT 10 between the electrodes of the capacitor 16, and to supply the potential {VSS+Vth+(VDD−Vda)} to the gate terminal of the driving TFT 10. With this, it is possible to cause the organic EL device 17 to emit light at desired luminance while compensating the threshold voltage of the driving TFT 10. Further, by controlling the data line Sj to be in the high impedance state while a high-level potential is being supplied to the scanning lines Gi and Ei, it is possible to prevent an unnecessary current from flowing from the power line Vp to the data line Sj. Moreover, by connecting the source terminal of the switching TFT 13 to the common cathode Vcom, it is possible to apply a predetermined potential to the anode terminal of the organic EL device 17 from the common cathode Vcom without providing a new power line.

Second Embodiment

Figure 5:
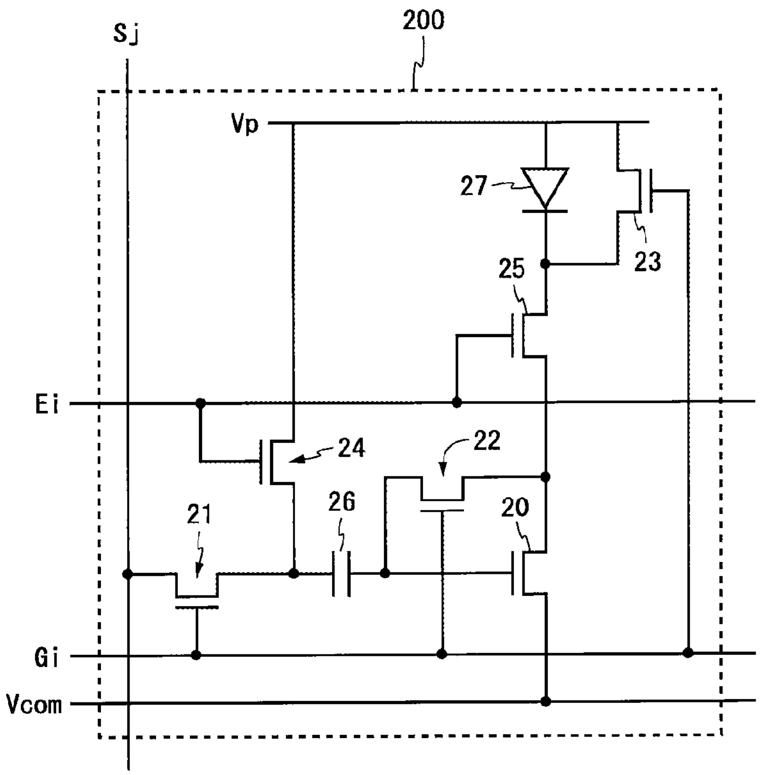
FIG. 5 is a circuit diagram of a pixel circuit included in a display device according to the second embodiment of the present invention.

FIG. 5 is a circuit diagram of a pixel circuit included in the display device according to the second embodiment of the present invention. A pixel circuit 200 shown in FIG. 5 is provided with a driving TFT 20, switching TFTs 21 to 25, a capacitor 26, and an organic EL device 27. The pixel circuit 200 corresponds to each of the pixel circuits Aij in FIG. 1. All of the driving TFT 20 and the switching TFTs 21 to 25 are N-channel type transistors.

The pixel circuit 200 is connected to the common anode Vp, the power line Vcom, the scanning line Gi (first scanning line), the scanning line Ei (second scanning line), and the data line Sj. To the common anode Vp and the power line Vcom, respectively, the constant power source potentials VDD and VSS are applied. The common anode Vp is a common electrode common to all of the organic EL devices 27 within the display device. The common anode Vp functions as a first conductive member, and the power line Vcom functions as a second conductive member.

In the pixel circuit 200, the organic EL device 27, the switching TFT 25, and the driving TFT 20 are provided in series on a route connecting the common anode Vp and the power line Vcom in the stated order from a side of the common anode Vp. More specifically, an anode terminal of the organic EL device 27 is connected to the common anode Vp, and the cathode terminal of the organic EL device 27 is connected to a drain terminal of the switching TFT 25. A source terminal of the switching TFT 25 is connected to a drain terminal of the driving TFT 20, and a source terminal of the driving TFT 20 is connected to the power line Vcom. In this manner, in the pixel circuit 200, the organic EL device 27 is provided between the drain terminal of the switching TFT 25 and the common anode Vp, and the source terminal of the driving TFT 20 is connected to the power line Vcom.

One electrode of the capacitor 26 (an electrode on the right side in FIG. 5, and hereinafter referred to as a first electrode) is connected to a gate terminal of the driving TFT 20. The switching TFT 21 is provided between the other electrode of the capacitor 26 (an electrode on the left side in FIG. 5, and hereinafter referred to as a second electrode) and the data line Sj. The switching TFT 22 is provided between the gate terminal and the drain terminal of the driving TFT 20. The switching TFT 23 is provided between the cathode terminal of the organic EL device 27 and the common anode Vp. A source terminal of the switching TFT 23 is connected to the node to which the cathode terminal of the organic EL device 27 is connected, and a drain terminal of the switching TFT 23 is connected to the common anode Vp. In this manner, the switching TFT 23 is provided between the common anode Vp and the power line Vcom in parallel to the organic EL device 27. The switching TFT 24 is provided between the second electrode of the capacitor 26 and the common anode Vp. The gate terminals of the switching TFTs 21 to 23 are connected to the scanning line Gi, and the gate terminals of the switching TFTs 24 and 25 are connected to the scanning line Ei.

The pixel circuit 200 operates at the same timings as the pixel circuit 100 according to the first embodiment (see FIG. 3). In the pixel circuit 200, the gate potential of the driving TFT 20 is Vg. In the following, an operation of the pixel circuit 200 is described with reference to FIG. 3 and FIG. 6A to FIG. 6E.

Before the time t1, the potential of the scanning line Gi is controlled to be low-level, and the potential of the scanning line Ei is controlled to be high-level. At this time, the switching TFTs 21 to 23 are in the OFF state, and the switching TFTs 24 and 25 are in the ON state. Further, the driving TFT 20 is also in the ON state. Therefore, a current flows between the common anode Vp and the power line Vcom, passing through the organic EL device 27, the switching TFT 25, and the driving TFT 20, and this causes the organic EL device 27 to emit light (see FIG. 6A).

At the time t1, when the potential of the scanning line Gi changes to high-level, the switching TFTs 21 to 23 are turned to the ON state. Further, from the time t1 to the time t2, the data line Sj is controlled to be in the high impedance state. A resistance of the switching TFT 23 is sufficiently smaller than a resistance of the organic EL device 27. Therefore, when the switching TFT 23 is turned to the ON state, the current that has been flowing through the organic EL device 27 flows through the switching TFT 23 from the common anode Vp, and this turns the organic EL device 27 off (see FIG. 6B). Further, when the switching TFT 22 is turned to the ON state, a current from the common anode Vp flows through the switching TFT 23, the switching TFT 25, and the switching TFT 22, and the gate potential Vg of the driving TFT 20 rises up to the potential VDD of the common anode Vp. It should be noted that the data line Sj is controlled to be in the high impedance state at this time, and therefore even if the switching TFT 21 is turned to the ON state, an unnecessary current does not flow between the common anode Vp and the data line Sj through the switching TFT 24 and the switching TFT 21.

At the time t2, when the potential of the scanning line Ei changes to low-level the switching TFTs 24 and 25 are turned to the OFF state. Further, during a period from the time t2 to the time t3, the data potential Vda according to the display data is applied to the data line Sj. When the switching TFT 25 is turned to the OFF state, the current that has been flowing from the common anode Vp stops flowing, and a current Ic flows between the gate terminal of the driving TFT 20 and the power line Vcom, passing through the switching TFT 22 and the driving TFT 20 (see FIG. 6C).

When the current Ic flows, the gate potential Vg of the driving TFT 20 drops. When a potential difference between the gate and the source of the driving TFT 20 becomes equal to the threshold voltage Vth of the driving TFT 20, the driving TFT 20 is turned to the OFF state, and the current Ic stops flowing. Therefore, the gate potential Vg of the driving TFT 20 reaches (VSS+Vth) after a while from the time t2, and stops dropping after this point.

Further, when the data potential Vda is applied to the data line Sj, a current flows from the data line Sj to the second electrode of the capacitor 26 through the switching TFT 21. Therefore, the potential of the second electrode of the capacitor 26 becomes equal to the data potential Vda. As a result, after a while from the time t2, the potential of the first electrode of the capacitor 26 becomes equal to (VSS+Vth), and the potential of the second electrode becomes Vda.

At the time t3, when the potential of the scanning line Gi changes to low-level, the switching TFTs 21 to 23 are turned to the OFF state. At this time, the capacitor 26 holds the potential difference (VSS+Vth−Vda) between the electrodes (see FIG. 6D).

At a time t4, when the potential of the scanning line Ei changes to high-level, the switching TFTs 24 and 25 are turned to the ON state. When the switching TFT 24 is turned to the ON state, a current flows from the common anode Vp to the second electrode of the capacitor 26 through the switching TFT 24, and the potential of the second electrode of the capacitor 26 rises up to the potential VDD of the common anode Vp. The potential difference between the electrodes of the capacitor 26 does not change before and after the time t4, and therefore when the potential of the second electrode of the capacitor 26 changes from Vda to VDD, the potential of the first electrode of the capacitor 26 changes by the same amount (VDD−Vda). Therefore, the gate potential Vg of the driving TFT 20 changes from (VSS+Vth) to {VSS+Vth+(VDD−Vda)}.

Figure 6A:
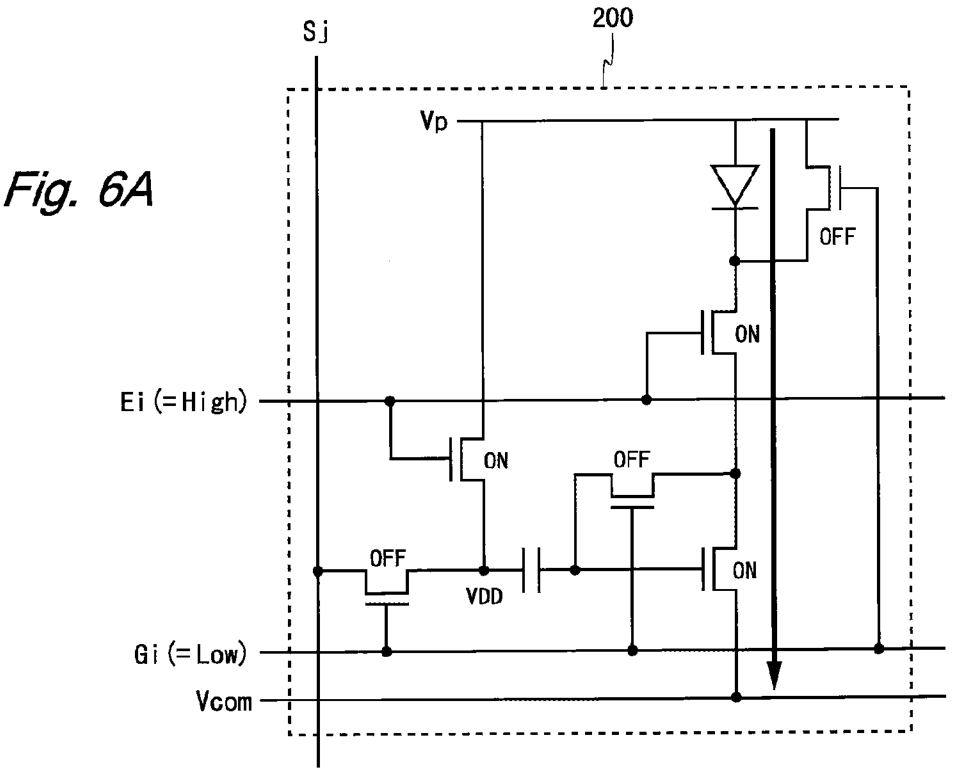
FIG. 6A is a diagram illustrating a state of the pixel circuit shown in FIG. 5 before writing.
Figure 6B:
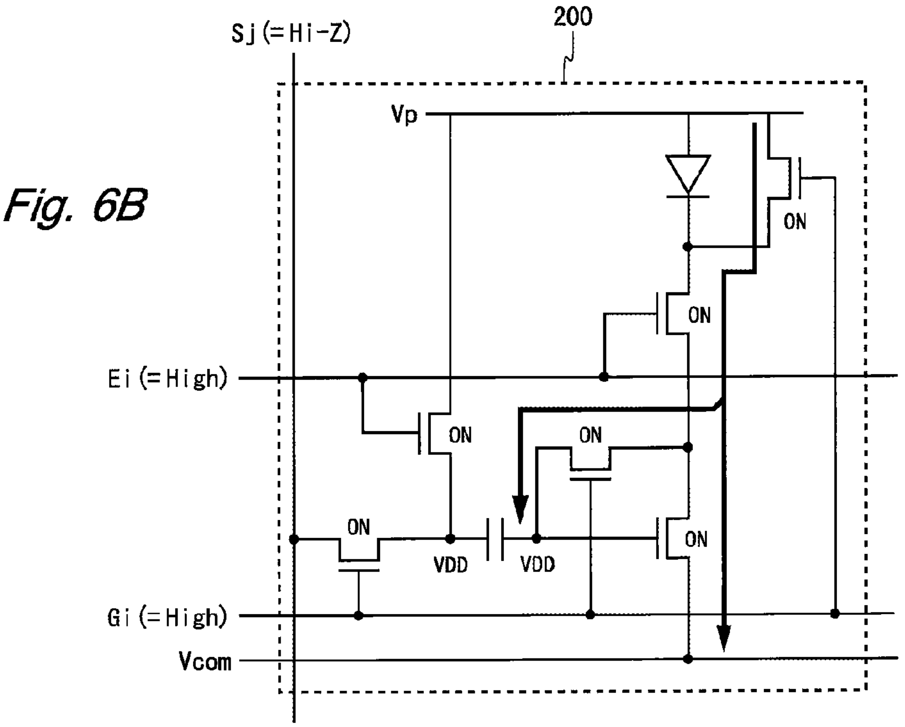
FIG. 6B is a diagram illustrating a state of the pixel circuit shown in FIG. 5 in initialization.
Figure 6C:
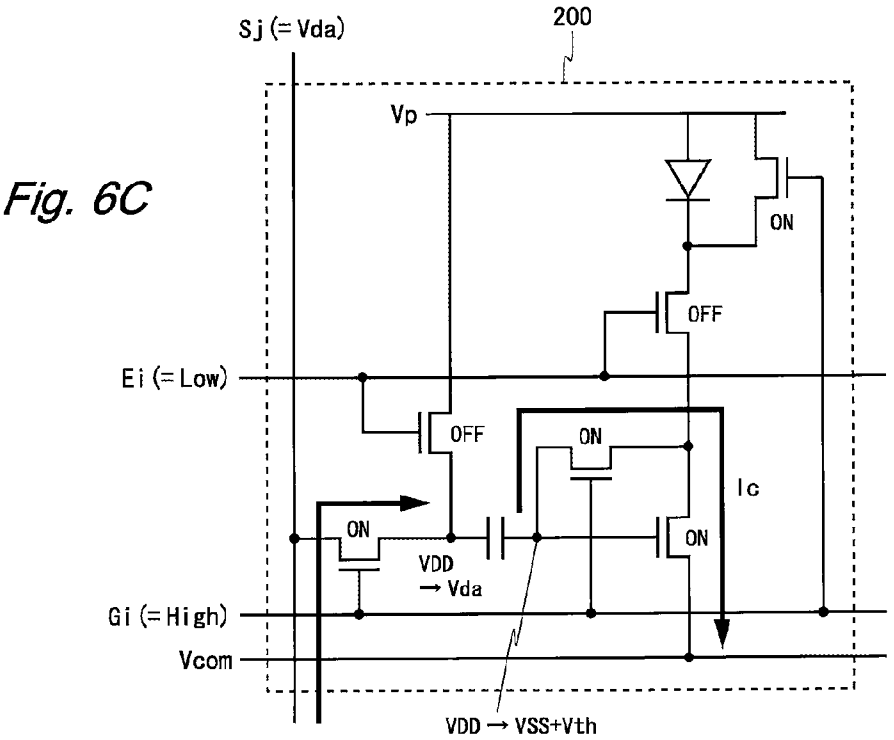
FIG. 6C is a diagram illustrating a state of the pixel circuit shown in FIG. 5 during writing.
Figure 6D:
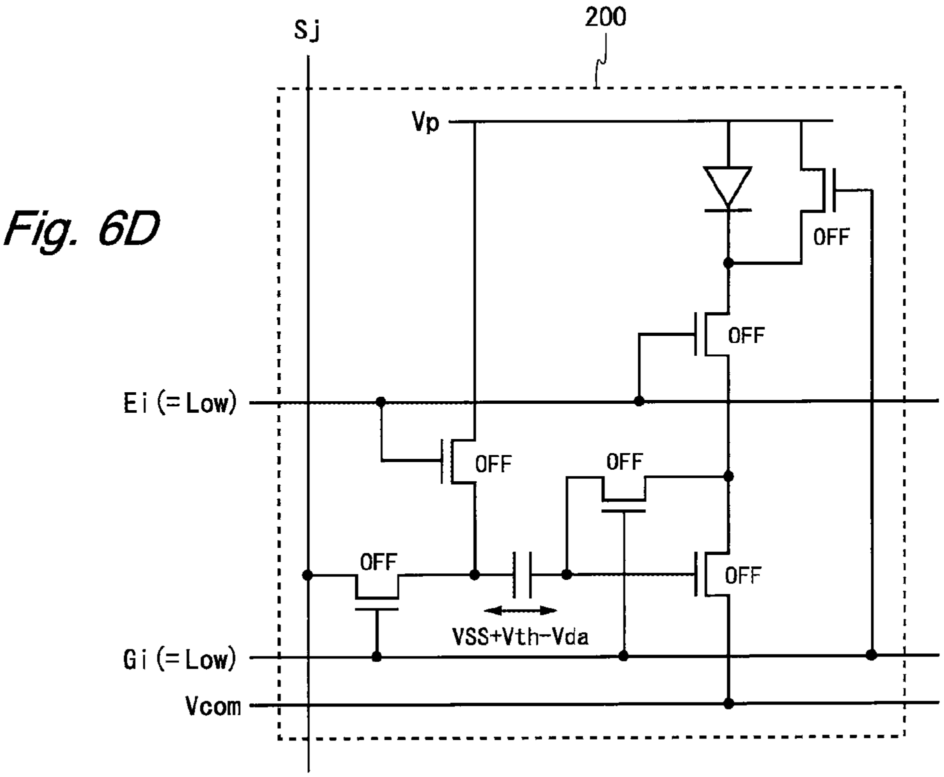
FIG. 6D is a diagram illustrating a state of the pixel circuit shown in FIG. 5 before lighting.
Figure 6E:
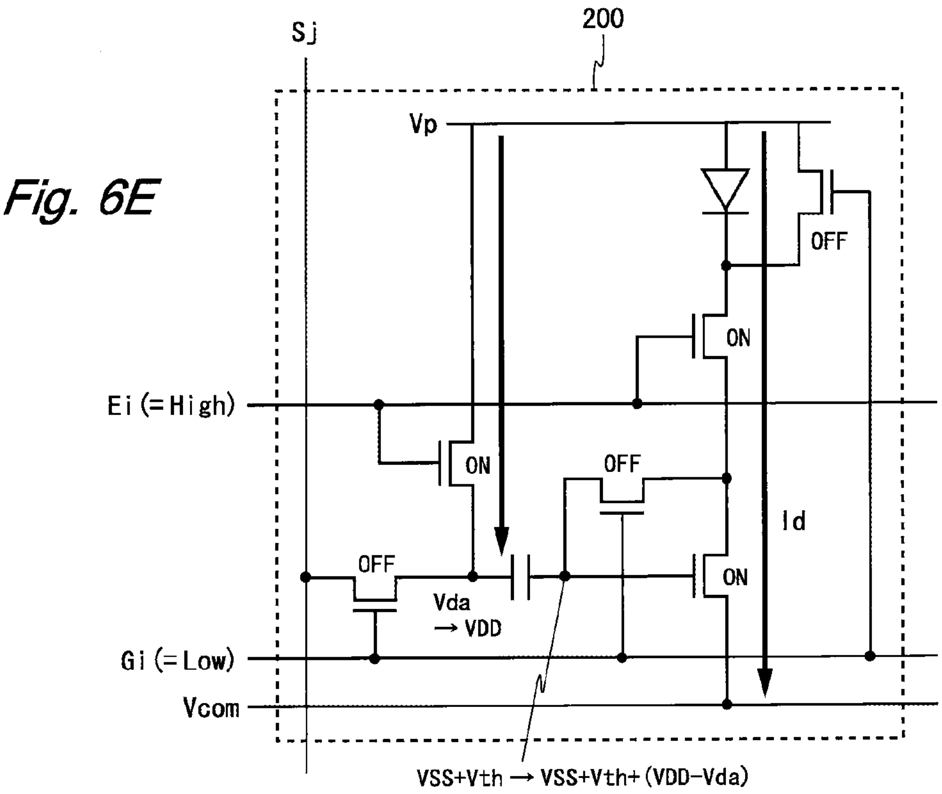
FIG. 6E is a diagram illustrating a state of the pixel circuit shown in FIG. 5 after lighting.

Further, as the switching TFT 25 is turned to the ON state, a current Id flows between the common anode Vp and the power line Vcom, passing through the organic EL device 27, the switching TFT 25, and the driving TFT 20, and this causes the organic EL device 27 to emit light (see FIG. 6E). When the gate potential of the driving TFT 20 is Vg, and the threshold voltage of the driving TFT 20 is Vth, an amount of the current Id is proportional to (Vg−Vth)2. Further, after the time t4, the gate potential Vg of the driving TFT 20 is {VSS+Vth+(VDD−Vda)}.

Accordingly, the amount of the current Id changes according to the data potential Vda, and is not dependent upon the threshold voltage Vth of the driving TFT 20. Therefore, even if the threshold voltage Vth of the driving TFT 20 includes variation, the amount of the current Id that flows through the organic EL device 27 after the time t4 remains the same, and the organic EL device 27 emits light at luminance according to the display data. Thus, by driving the pixel circuit 200 according to the timings shown in FIG. 3, it is possible to compensate the threshold voltage of the driving TFT 20 and to cause the organic EL device 27 to emit light at desired luminance.

As described above, according to the display device of this embodiment, similarly to the display device according to the first embodiment, it is possible to achieve an organic EL display provided with the pixel circuit 200 that is configured by N-channel type transistors, can be driven using two types of the scanning lines Gi and Ei, and is capable of compensating the threshold voltage of the driving TFT 20. Further, by connecting the drain terminal of the switching TFT 23 to the common anode Vp, it is possible to apply a predetermined potential to the cathode terminal of the organic EL device 27 from the common anode Vp without providing a new power line.

Figure 7:
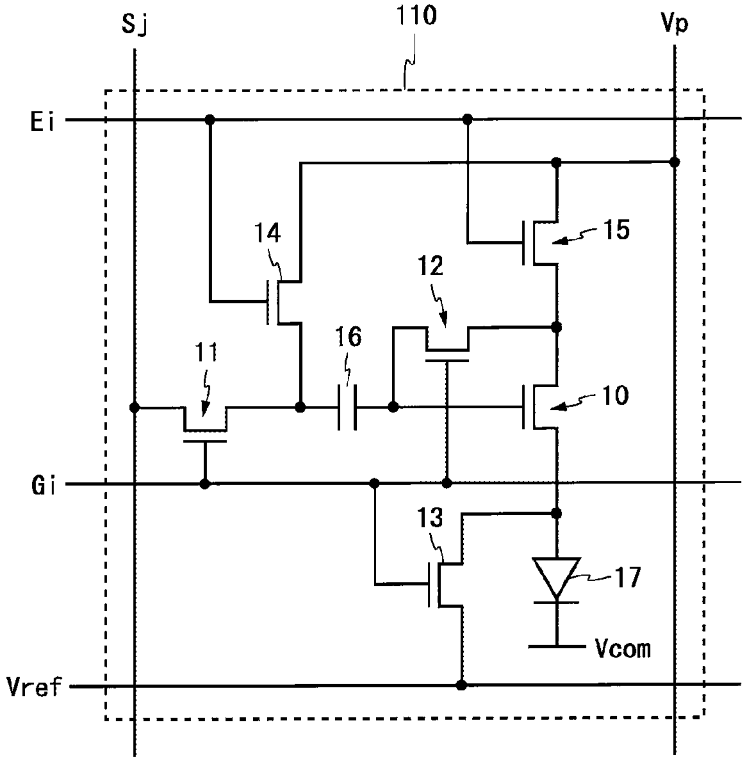
FIG. 7 is a circuit diagram of a pixel circuit included in a display device according to a first modified example of the present invention.

It should be noted that modified examples described below can be obtained from the display device according to the first and second embodiments. FIG. 7 is a circuit diagram of a pixel circuit included in a display device according to a first modified example of the present invention. A pixel circuit 110 shown in FIG. 7 is obtained by modifying the pixel circuit 100 according to the first embodiment (FIG. 2) such that the source terminal of the switching TFT 13 is connected to a constant power line Vref. To the constant power line Vref, an arbitrary potential is applied such that a voltage applied to the organic EL device 17 is lower than a threshold voltage for light emission.

For the pixel circuit 100 shown in FIG. 2, in order to connect the source terminal of the switching TFT 13 to the common cathode Vcom, it is necessary to provide a contact for connecting to a cathode electrode of the organic EL device 17 disposed on a top surface of the TFT substrate, through an EL layer of the organic EL device 17 provided on an upper surface side of the TFT substrate. Therefore, a manufacturing process of the display device having the pixel circuit 100 is complicated in order to provide the contact.

By contrast, in the pixel circuit 110 shown in FIG. 7, the source terminal of the switching TFT 13 is connected to the constant power line Vref. As the constant power line Vref is provided over the TFT substrate, it is not necessary to provide the contact for the pixel circuit 110. Therefore, according to the display device having the pixel circuit 110, it is possible to simplify the manufacturing process.

Figure 8:
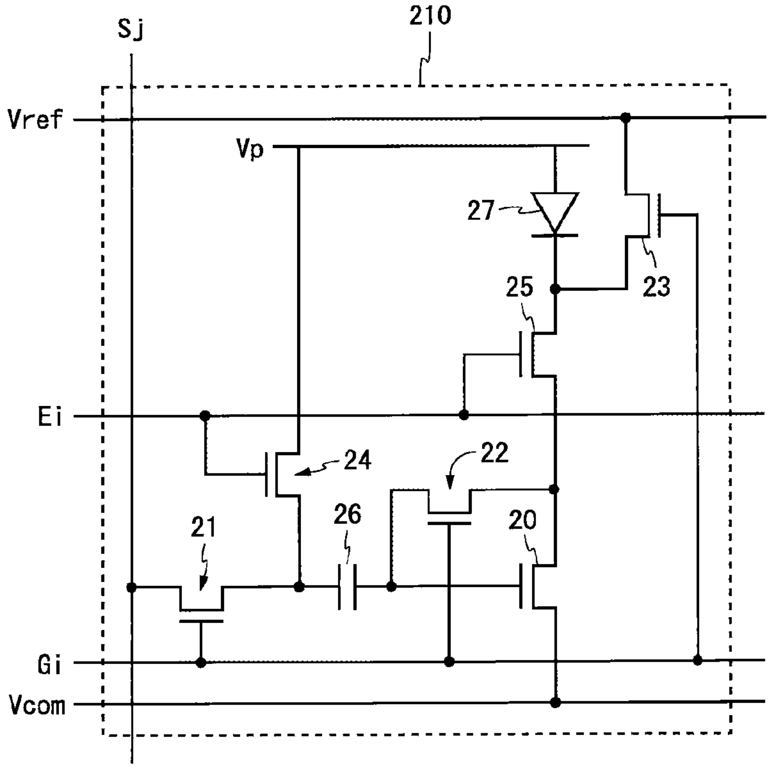
FIG. 8 is a circuit diagram of a pixel circuit included in a display device according to a second modified example of the present invention.

FIG. 8 is a circuit diagram of a pixel circuit included in a display device according to a second modified example of the present invention. A pixel circuit 210 shown in FIG. 8 is obtained by modifying the pixel circuit 200 according to the second embodiment (FIG. 5) such that the drain terminal of the switching TFT 23 is connected to the constant power line Vref. The display device having the pixel circuit 210 provides the same advantageous effect as the display device having the pixel circuit 110.

As described above, according to the present invention, it is possible to provide a display device having a pixel circuit that is configured by N-channel type transistors and can be driven using two types of scanning lines.

INDUSTRIAL APPLICABILITY

The display device according to the present invention is advantageously capable of driving a pixel circuit configured by N-channel type transistors using two types of scanning lines, and thus can be utilized as a current-driven display device for an organic EL display and such.

DESCRIPTION OF REFERENCE CHARACTERS

1 Display Device
2 Display Control Circuit
3 Gate Driver Circuit
4 Source Driver Circuit
5 Shift Register
6 Register
7 Latch Circuit
8 D/A Converter
9 Analog Switch
10, 20 Driving TFT
11 to 15, 21 to 25 Switching TFT
16, 26 Capacitor
17, 27 Organic EL Device
100, 110, 200, 210 Pixel Circuit

The invention claimed is:

1. A current-driven display device comprising:

a plurality of pixel circuits arranged two-dimensionally and each configured by an N-channel type transistor;

a plurality of first scanning lines and a plurality of second scanning lines, each of the first and second scanning lines being provided for a row of the pixel circuits;

a plurality of data lines each provided for a column of the pixel circuits;

a scanning line drive circuit configured to select the pixel circuits by row using the first and second scanning lines; and a data line drive circuit configured to supply a data potential according to display data to the data line, wherein each of the pixel circuits includes:

an electro-optical device provided between a first conductive member to which a first power source potential is applied and a second conductive member to which a second power source potential is applied;

a driving transistor provided between the first and second conductive members in series with the electro-optical device;

a capacitor having a first electrode connected to a gate terminal of the driving transistor;

a first switching transistor provided between a second electrode of the capacitor and the data line;

a second switching transistor provided between the gate terminal and a drain terminal of the driving transistor;

a third switching transistor having one conducting terminal connected to a node to which one terminal of the electro-optical device is connected;

a fourth switching transistor provided between the second electrode of the capacitor and the first conductive member, wherein the fourth switching transistor is directly connected to the first conductive member; and a fifth switching transistor provided between the first and second conductive members in series with the electro-optical device and the driving transistor, and having a source terminal connected to the drain terminal of the driving transistor, and gate terminals of the first, second, and third switching transistors are connected to the first scanning line, and gate terminals of the fourth and fifth switching transistors are connected to the second scanning line.

2. The display device according to claim 1, wherein the electro-optical device is provided between a source terminal of the driving transistor and the second conductive member, and a drain terminal of the fifth switching transistor is connected to the first conductive member.

3. The display device according to claim 2, wherein a source terminal of the third switching transistor is connected to the second conductive member.

4. The display device according to claim 1, wherein the electro-optical device is provided between a drain terminal of the fifth switching transistor and the first conductive member, and a source terminal of the driving transistor is connected to the second conductive member.

5. The display device according to claim 4, wherein a drain terminal of the third switching transistor is connected to the first conductive member.

6. The display device according to claim 1, wherein when selecting the pixel circuits, the scanning line drive circuit supplies a high-level potential to the first scanning line for a predetermined period of time, a low-level potential to the second scanning line after supplying the high-level potential to the first scanning line, and a high-level potential to the second scanning line after supplying a low-level potential to the first scanning line, and the data line drive circuit controls the data line to be in a high impedance state while the high-level potentials are being supplied to the first and second scanning lines, and supplies the data potential to the data line while the high-level potential is being supplied to the first scanning line and the low-level potential is being supplied to the second scanning line.

7. The display device according to claim 1, wherein the electro-optical device is configured by an organic EL device.

* * * * *